(12) United States Patent
Wang et al.

(10) Patent No.: US 11,812,706 B2
(45) Date of Patent: Nov. 14, 2023

(54) TRANSMISSION ASSEMBLY AND GARDEN TOOL

(71) Applicant: Globe (Jiangsu) Co., Ltd., Changzhou (CN)

(72) Inventors: Shisheng Wang, Changzhou (CN); Xiaohui Huo, Changzhou (CN); Jianbo Li, Changzhou (CN); Lingao Zhang, Changzhou (CN)

(73) Assignee: Globe (Jiangsu) Co., Ltd., Changzhou (CN)

( * ) Notice: Subject to any disclaimer, the term of this patent is extended or adjusted under 35 U.S.C. 154(b) by 254 days.

(21) Appl. No.: 17/340,113

(22) Filed: Jun. 7, 2021

(65) Prior Publication Data
US 2021/0392821 A1    Dec. 23, 2021

(30) Foreign Application Priority Data
Jun. 17, 2020   (CN) .......................... 202010553894.2

(51) Int. Cl.
| | | |
|---|---|---|
| *A01G 3/053* | (2006.01) | |
| *A01G 3/08* | (2006.01) | |
| *F16H 1/20* | (2006.01) | |
| *F16H 57/023* | (2012.01) | |
| *F16H 57/021* | (2012.01) | |

(Continued)

(52) U.S. Cl.
CPC .............. *A01G 3/053* (2013.01); *A01G 3/085* (2013.01); *F16H 1/203* (2013.01); *F16H 57/021* (2013.01); *F16H 57/023* (2013.01); *A01G 2003/0461* (2013.01); *F16H 2057/02073* (2013.01)

(58) Field of Classification Search
CPC ................... A01G 8/053; A01G 3/085; A01G 2003/0461; A01G 3/0535; F16H 57/021; F16H 57/023; F16H 1/203; F16H 2057/0273; A01D 34/902
USPC ...... 30/277.4, 216, 223, 224, 225, 264, 270, 30/123, 277, 210, 276
See application file for complete search history.

(56) References Cited

U.S. PATENT DOCUMENTS

| | | | | |
|---|---|---|---|---|
| 1,984,043 A | * | 12/1934 | Sieg .......................... | B26D 5/22 83/57 |
| 2,406,009 A | * | 8/1946 | Forster .................. | B23F 23/085 409/27 |

(Continued)

*Primary Examiner* — Ghassem Alie (57) ABSTRACT

The present disclosure provides a transmission assembly and a garden tool. The transmission assembly is configured to connect a drive assembly and a garden work assembly. The transmission assembly comprises a casing and a first transmission component and a second transmission component accommodated in the casing; the first transmission component and the second transmission component are engaged with each other; the first transmission component comprises a first gear and a second gear engaged with each other; a gear shaft of the first gear is disposed at an angle with respect to a gear shaft of the second gear; and the second transmission component comprises a third gear able to rotate coaxially with the second gear and a fourth gear engaged with the third gear. With two levels of transmission components provided in the transmission assembly of the present disclosure, the output power of the garden tool can be controlled effectively, and the cost for using and producing the garden tool of the present disclosure are reduced while ensuring that the garden tool can be used normally.

10 Claims, 4 Drawing Sheets

(51) Int. Cl.
*A01G 3/04* (2006.01)
*F16H 57/02* (2012.01)

(56) References Cited

U.S. PATENT DOCUMENTS

| | | | | |
|---|---|---|---|---|
| 2,757,453 | A | | 8/1956 | Brunson |
| 5,174,099 | A | * | 12/1992 | Matsuura ............... A01D 34/76 |
| | | | | 56/255 |
| 5,771,583 | A | | 6/1998 | Stihl |
| 6,076,265 | A | * | 6/2000 | Huang Lo .............. A01D 34/76 |
| | | | | 56/255 |
| 7,320,384 | B2 | * | 1/2008 | Huang ................ F16H 57/0434 |
| | | | | 184/11.1 |
| 11,548,133 | B2 | * | 1/2023 | Li .......................... A01G 3/086 |
| 2002/0032965 | A1 | * | 3/2002 | Langhans ............ A01D 34/902 |
| | | | | 30/227 |
| 2013/0326885 | A1 | * | 12/2013 | Kaupp ................... A01G 3/053 |
| | | | | 30/208 |
| 2019/0160622 | A1 | * | 5/2019 | Barth ...................... B24B 47/12 |

* cited by examiner

TRANSMISSION ASSEMBLY AND GARDEN TOOL

CROSS REFERENCE TO RELATED APPLICATION

The present application claims the benefit of priority to Chinese Patent Application No. CN2020105538942, filed with CNIPA on Jun. 17, 2020, the disclosure of which is incorporated herein by reference in its entirety.

TECHNICAL FIELD

The present disclosure relates to a transmission assembly and a garden tool with the transmission assembly.

BACKGROUND

As a type of machinery that can quickly help people accomplish gardening work, garden tools are being used more and more widely in the society nowadays. Because a garden tool can usually extend a user's reach, it can conveniently and quickly assist the user in cutting trees/shrubs, especially during high branches pruning and shrub pruning.

However, although a pruner for performing high-branch pruning in the prior art can assist a user in accomplishing a corresponding garden task, it usually cannot be controlled to achieve a high cutting efficiency due to limitations of its transmission structure, and therefore it is not widely used.

In view of this, there is indeed a need to improve the existing garden tools to solve the above problems.

SUMMARY

An advantage of the present disclosure is that it provides a transmission assembly and a garden tool using the transmission assembly. With two levels of transmission components provided in the transmission assembly, the rotation speed of a driver motor of the garden tool using the transmission assembly can be effectively reduced, the output power of the garden tool can be controlled effectively, and the cost for using and manufacturing the garden tool of the present disclosure are reduced while ensuring the normal use effect of the garden tool.

To achieve the above-mentioned advantage, the present disclosure provides a transmission assembly for connecting a drive assembly and a garden work assembly, the transmission assembly including a casing and a first transmission component and a second transmission component accommodated in the casing, wherein the first transmission component and the second transmission component are engaged with each other; the first transmission component includes a first gear and a second gear engaged with each other; a gear shaft of the first gear is disposed at an angle with respect to a gear shaft of the second gear; and the second transmission component comprises a third gear rotating coaxially with the second gear and a fourth gear engaged with the third gear; and the number of teeth of the first gear is smaller than the number of teeth of the second gear, and the number of teeth of the third gear is smaller than the number of teeth of the fourth gear.

As an improvement of the present disclosure, the first gear and the second gear are further configured to be both bevel gears; the gear shaft of the first gear is coupled to a drive shaft of the drive assembly by a spline; and a first support member is provided between the first gear and the drive shaft, the number of first support member being one or more.

As an improvement of the present disclosure, the second gear further has a connecting shaft for connecting the third gear; the third gear is riveted to the connecting shaft; and a second support member is provided between the second gear and the third gear, the second support member being sleeved on the connecting shaft of the second gear, and the number of the second support member being one or more.

As an improvement of the present disclosure, the first support member and/or the second support member is further configured to be one of a bearing or a sliding sleeve, and the first support member and/or the second support member is riveted to the casing.

As an improvement of the present disclosure, the third gear is a cylindrical gear provided coaxially with the second gear, and the fourth gear is an eccentric wheel engaged with the cylindrical gear.

As an improvement of the present disclosure, the gear shaft of the first gear and the gear shaft of the second gear are perpendicular to each other; and the gear shaft of the second gear, and gear shafts of the third gear and the fourth gear are parallel to each other.

To achieve the above-mentioned advantage, the present disclosure further provides a garden tool, the garden tool further including a garden work assembly for performing a branch/shrub pruning task, a drive assembly for driving the garden work assembly, and a power supply assembly for supplying power to the drive assembly, wherein the garden tool further includes a transmission assembly for connecting the drive assembly and the garden work assembly, and the transmission assembly is the transmission assembly of any one of claims 1-6.

As an improvement of the present disclosure, the drive assembly includes a housing, a drive motor accommodated in the housing, a connecting rod component for connecting the drive motor and the transmission assembly, and a control component for controlling the operation of the drive motor, with the power supply assembly being accommodated in the housing and electrically connected to the drive motor.

As an improvement of the present disclosure, the connecting rod component includes a hard shaft inserted in a motor clamp tube of the drive motor and a connecting rod for accommodating the hard shaft, with one end of the hard shaft being connected to the gear shaft of the first gear and the other end thereof being connected in the motor clamp tube of the drive motor.

As an improvement of the present disclosure, one end of the connecting rod is inserted in the casing of the transmission assembly and the other end thereof is connected and accommodated in the housing and a positioning bearing for fixing and positing the as hard shaft is further provided in the connecting rod.

The present disclosure has the following beneficial effects: with the first transmission component and the second transmission component engaged with each other provided in the transmission assembly of the present disclosure, the transmission ratio of the drive assembly and the garden work assembly connected at both ends of the transmission components can be effectively adjusted, and the transmission assembly has a simple structure and thus is easy to manufacture and assemble. Furthermore, the garden tool using the transmission assembly can efficiently and quickly accomplish corresponding gardening work, ensures that the drive assembly has a stable and suitable output and a small output power, and also ensures the working efficiency of the garden work assembly; and it effectively improves the practicality of the garden tool, and reduces the cost for using and manufacturing the garden tool.

DESCRIPTION OF THE EMBODIMENTS

Figure 1:
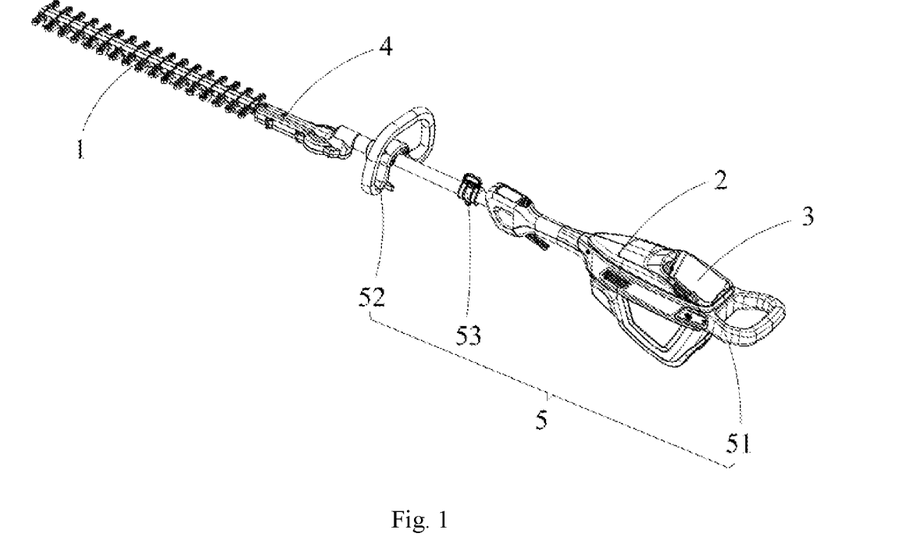
FIG. 1 is a structure diagram of a garden tool of the present disclosure.

FIG. 1 shows a garden tool 100 for pruning provided in the present disclosure. The garden tool 100 includes a garden work assembly 1 for performing a garden work task, a drive assembly 2 for driving the garden work assembly 1, a power supply assembly 3 for supplying power to the drive assembly 2, and a transmission assembly 4 for connecting the drive assembly 2 and the garden work assembly 1.

Figure 2:
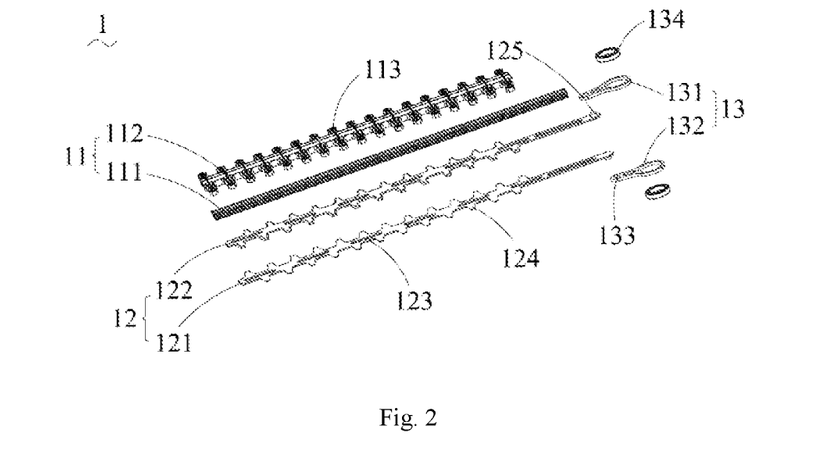
FIG. 2 shows dissembled parts of a garden work assembly in FIG. 1.

Referring to FIG. 2, in the present disclosure, the garden work assembly 1 is a cutter assembly for performing a branch/shrub pruning task, and the garden work assembly 1 is driven by the drive assembly 2 through the transmission assembly 4. The garden work assembly 1 includes a cutter blade guard 11 connected and positioned to an extended end of the transmission assembly 4, a cutter blade assembly 12 slidably connected to the cutter blade guard 11, and connecting members 13 that connect the cutter blade assembly 12 and the transmission assembly 4 in a transmission manner.

The cutter blade guard 11 includes a support bar 111 fixed to the end of an extending portion of the transmission assembly 4 by a threaded structure, and a guard member 112 removably connected to the support bar 111, wherein one end of the guard member 112 abuts against the end of the e extending portion of the transmission assembly 4 and the other end thereof extends outward; further, both sides of the guard member 112 are provided with guard teeth 113; specifically, the guard teeth 113 protrude outward and perpendicular to the extension direction and are uniformly and symmetrically provided on both sides of the guard member 112.

The plane where the guard member 112 is located is defined as a working plane; in the present disclosure, the cutter blade assembly 12 has a first cutter blade 121 and a second cutter blade 122 separated by the working plane. The first cutter blade 121 and the second cutter blade 122 are both provided with corresponding sliding grooves 123, and the first cutter blade 121 and the second cutter blade 122 are slidably connected to the cutter blade guard 11 through threaded components and the sliding grooves 123. Specifically, both sides of the first cutter blade 121 and the second cutter blade 122 are provided with edge portions 124 extending outward and perpendicular to extension directions thereof; in the present disclosure, the edge portions 124 located on the left and right sides of the same cutter blade are staggered along the extension direction of the cutter blade; further, the edge portions 124 of the first cutter blade 121 and the second cutter blade 122 are provided along the extension direction of the cutter blade assembly 12 in a complementary manner; in this way, it can ensure in the working process of the garden tool 100 that the cutter blade assembly 12 always acts upon the object to be cut, to ensure the working efficiency of the garden work assembly 1.

In the present disclosure, the cutter blade assembly 12 is connected to the transmission assembly 4 through the connecting members 13. Specifically, the connecting members 13 includes a first connecting member 131 connected to the first cutter blade 121 and a second connecting member 132 connected to the second cutter blade 122. In the present disclosure, the first connecting member 131 and the second connecting member 132 are respectively provided with through holes 133 for connecting the first cutter blade 121 and the second cutter blade 122, and the first cutter blade 121 and the second cutter blade 122 are provided with fixing protrusions 125 corresponding to the through holes 133. In this embodiment, the connecting members 13, part of the cutter blade guard 11, and part of the cutter blade assembly 12 are accommodated in the transmission assembly 4.

Figure 3:
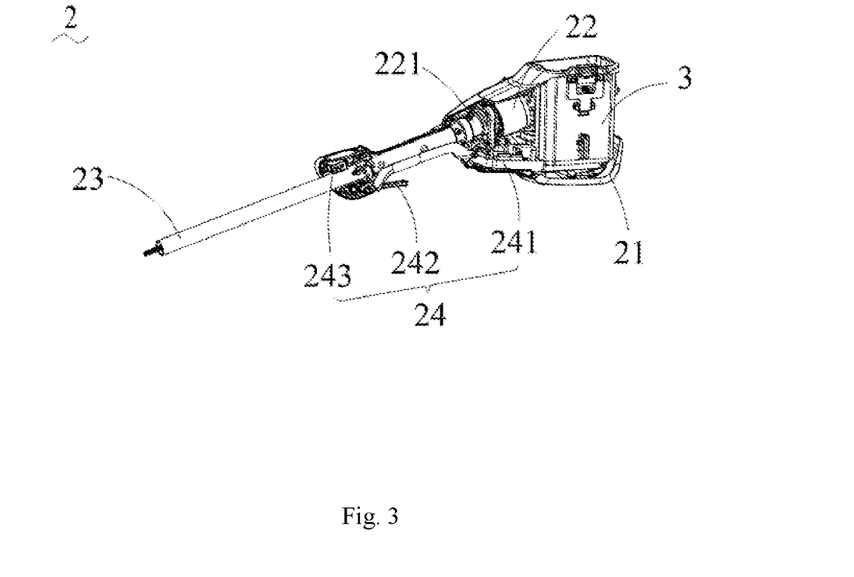
FIG. 3 shows dissembled parts of a drive assembly in FIG. 1.

Referring to FIGS. 2 and 3, the drive assembly 2 is configured to drive the garden work assembly 1 through the transmission assembly 4. In the present disclosure, the drive assembly 2 includes a housing 21, a drive motor 22 accommodated in the housing 21, a connecting rod component 23 for connecting the drive motor 22 and the transmission assembly 4, and a control component 24 for controlling the drive motor 22.

Specifically, the housing 21 includes a first housing and a second housing clamped with each other, and an accommodating space formed between the first housing and the second housing. The drive motor 22 is accommodated in the accommodating space to provide power to the garden work assembly 1. In this embodiment, the specific model of the drive motor 22 may be selected according to actual needs, so long as it ensures the normal operation of the garden work assembly 1.

Figure 4:
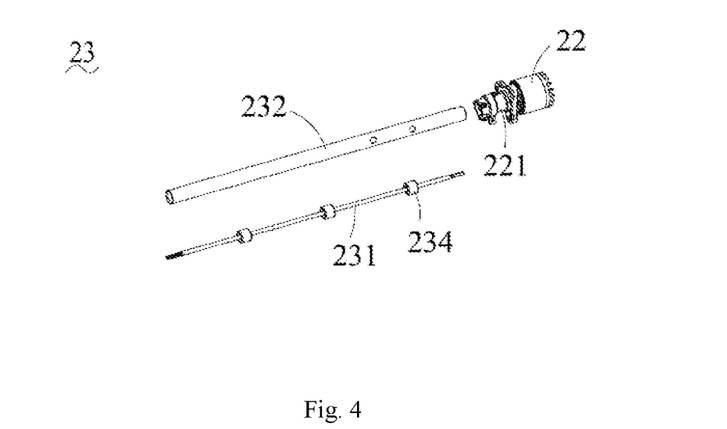
FIG. 4 shows dissembled parts of a drive motor and a connecting rod component in FIG. 3.

The connecting rod component 23 includes a hard shaft 231 connecting the drive motor 22 and the transmission assembly 4, and a connecting rod 232 for accommodating the hard shaft 231. Specifically, one end of the hard shaft 231 is connected to a motor shaft of the drive motor 22, and the other end thereof is connected to the transmission assembly 4 for power transmission. It is to be noted that the connecting manner of the hard shaft 231 and the motor shaft of the drive motor 22 is not limited in the present disclosure, i.e., in the present disclosure, the hard shaft 231 may be provided integrally with the motor shaft or separately from the motor shaft, so long as the stability is ensured when the hard shaft 231 is connected to the motor shaft.

The connecting rod 232 is configured in a hollow tubular shape, and in this embodiment, the drive motor 22 has a motor clamp tube 221 for connecting the connecting rod component 23, the motor clamp tube 221 being fixedly accommodated in the housing 21 and connected to the housing 21 by fixing structures such as a combination of a hoop and a bolt, to ensure the stability when the connecting rod component 23 is connected to the housing 21. Further, a positioning bearing 234 for fixing the hard shaft 231 is provided in the connecting rod 232. Such configuration can effectively prevent the hard shaft 231 from deformation due to high-speed rotation and suspension when driven by the drive motor 22.

Preferably, 3 positioning bearings 234 are provided, and the 3 positioning bearings 234 are uniformly arranged in the connecting rod 232, and in this embodiment, the outside of the positioning bearings 234 is also wrapped with shock-absorbing rubber to avoid an influence on the connecting rod 232 by the hard shaft 231.

The control component 24 is configured to control the drive motor 22. In the present disclosure, the control component 24 includes a printed circuit board (PCB) 241 accommodated in the housing 21, a control trigger 242 electrically connected to the PCB 241, and a speed regulating assembly 243, and the control trigger 242 and the speed regulating assembly 243 are provided at an end of an extending portion of the housing 21.

In an embodiment of the present disclosure, the PCB 241 is located below the drive motor 22 and is electrically connected to the drive motor 22 and the control component 24 respectively, and the control trigger 242 is located below the end of the extending portion of the housing 21 to aid a user in holding and controlling the device; further, the speed regulating assembly 243 has a membrane panel (not marked) fixed above the end of the extending portion of the housing 21, a speed regulating switch (not marked) and a self-locking speed regulating button (not marked). Such configuration can effectively improve the safety of the garden tool 100.

The power supply assembly 3 is configured to supply power to the drive assembly 2. In the present disclosure, the power supply assembly 3 is accommodated in the accommodating space of the housing 21 and is located at the tail of the drive motor 22. In an embodiment of the present disclosure, the power supply assembly 3 is a rechargeable lithium battery pack, and the housing 21 has a battery cavity for accommodating and electrically connecting the rechargeable lithium battery pack. Such configuration can facilitate the charging and replacement of the power supply assembly 3, and can effectively improve the practicality of the garden tool 100.

Figure 5:
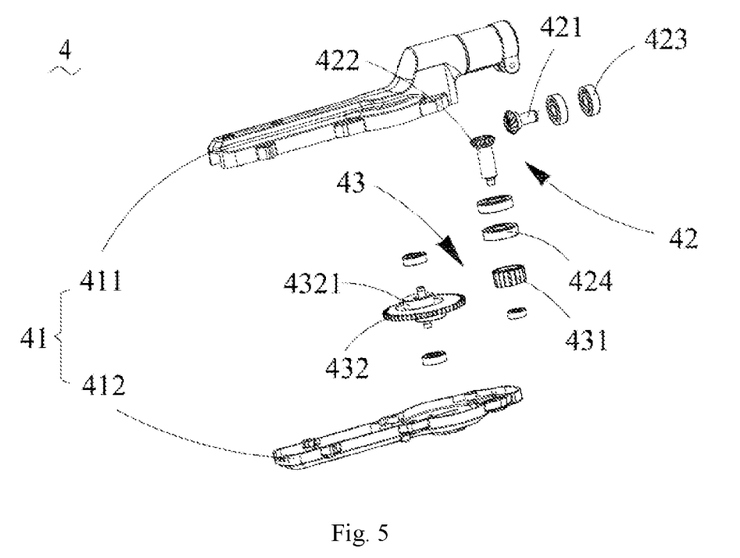
FIG. 5 shows dissembled parts of an embodiment of a transmission assembly in FIG. 1.
Figure 6:
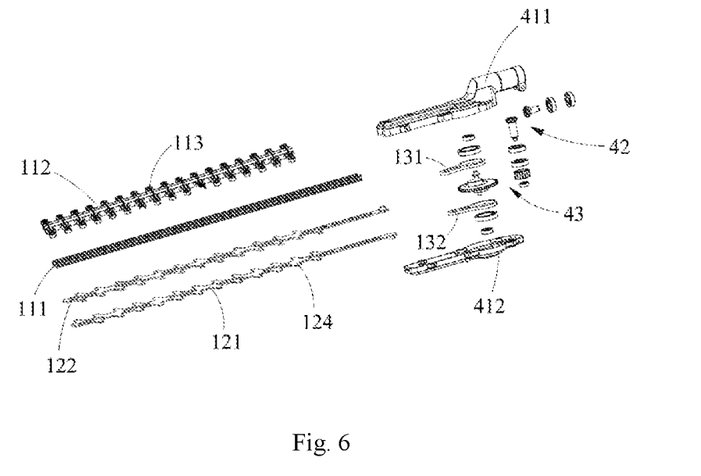
FIG. 6 shows dissembled parts of the transmission assembly in FIG. 5 assembled with a garden work assembly.
Figure 7:
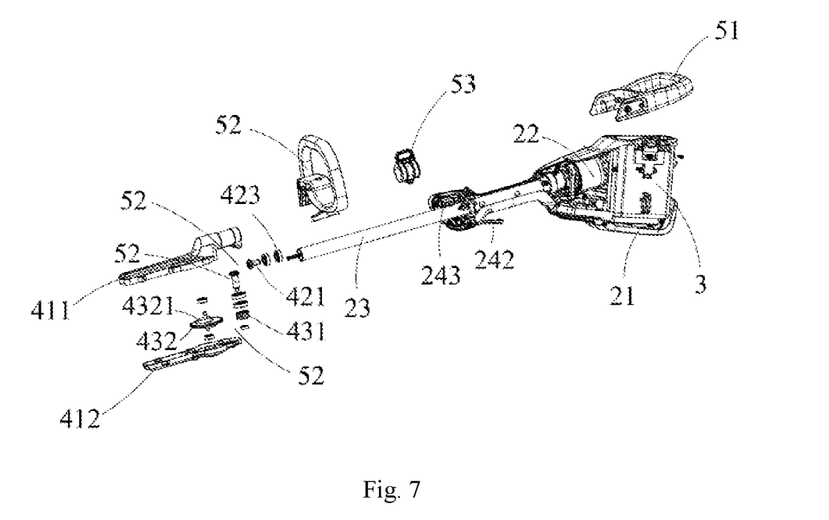
FIG. 7 shows dissembled parts of the transmission assembly in FIG. 5 assembled with a drive assembly and a holding assembly.

Referring to FIGS. 5 to 7, the transmission assembly 4 is configured to connect the drive assembly 2 and the garden work assembly 1, and includes a casing 41 and a first transmission component 42 and a second transmission component 43 accommodated in the casing 41.

Specifically, the casing 41 includes a gear box 411 and a gear box cover 412 buckled to the gear box 411, and the first transmission component 42 and the second transmission component 43 abut between a bottom wall of the gear box 411 and the gear box cover 412.

The first transmission component 42 includes a first gear 421 and a second gear 422 engaged with each other. In the present disclosure, a gear shaft of the first gear 421 is disposed at an angle with respect to a connecting shaft of the second gear 422; further, the axis of the gear shaft of the first gear 421 coincides with the axis of the hard shaft 231, and in an embodiment of the present disclosure, an extending end of the hard shaft 231 is splined with the first gear shaft of the first gear 421. With such configuration, a stable connection between the first gear 421 and the hard shaft 231 can be ensured without increasing the size of the connecting area between the first gear 421 and the hard shaft 231.

Further, between the first gear 421 and the hard shaft 231, a first support member 423 is provided, which is sleeved on the gear shaft of the first gear 421 and/or the extending end of the hard shaft 231. In the present disclosure, one or more first support members 423 are provided, and in an embodiment of the present disclosure, the first support members 423 are riveted to the gear box 411. Such configuration can effectively avoid shaking of the first gear 421 and the hard shaft 231 during transmission, to ensure transmission stability of the transmission assembly 4.

The second gear 422 has a connecting shaft (not marked) for connecting the second transmission component 43, and in an embodiment of the present disclosure, the connecting shaft of the second gear 422 is perpendicular to the gear shaft of the first gear 421. That means, the axis of the connecting shaft of the second gear 422 is perpendicular to that of the gear shaft of the first gear 421. With such configuration, the transmission direction of the second gear 422 can be changed so that the rotation axis of the second gear 422 is perpendicular to the working plane.

In the present disclosure, between the second gear 422 and the second transmission component 43 is also provided a second support member 424; similarly, one or more second support members 424 are provided, and in an embodiment of the present disclosure, the second support members 424 are riveted to the gear box 411. Such configuration can effectively avoid shaking of the second gear 422 during transmission to ensure transmission stability of the transmission assembly 4.

In an embodiment of the present disclosure, the first gear 421 and the second gear 422 are bevel gears engaged with each other, and in this embodiment, the number of teeth of the second gear 422 is larger than the number of teeth of the first gear 421 to reduce an output speed of the drive motor 22 and ensure the transmission stability of the transmission assembly 4.

The second transmission component 43 includes a third gear 431 and a fourth gear 432 engaged with each other. In the present disclosure, the third gear 431 is disposed coaxially with the second gear 422, i.e., the third gear 431 is sleeved on the connecting shaft of the second gear 422, and the second support members 424 are located between the second gear 422 and the third gear 431. In an embodiment of the present disclosure, the third gear 431 is a cylindrical gear configured in a cylindrical shape, and the cylindrical gear is fixed to an end of the connecting shaft away from the second gear 422 by a fixing member such as a fixing bearing (not marked).

The fourth gear 432 is engaged with the third gear 431. In the present disclosure, the fourth gear 432 is an eccentric wheel, and both sides of the eccentric wheel (along the axis direction of the eccentric wheel) are provided with eccentric columns 4321, which are parallel to the axis and at a distance from the axis; the first connecting member 131 and the second connecting member 132 are respectively connected to the eccentric column 4321 through rotating bearings 134; and the first cutter blade 121 and the second cutter blade 122 may be caused to reciprocate in the extension directions thereof when the fourth gear 432 rotates. In particular, the eccentric column 4321 is formed integrally with the fourth gear 432, but in other embodiments of the present disclosure, the eccentric column 4321 may also be provided separately from the fourth gear 432, i.e., the specific connection form of the eccentric column 4321 and the fourth gear 432 in the present disclosure may be selected according to actual needs, and is not limited here.

Specifically, the first connecting member 131 and the second connecting member 132 are accommodated in the casing 41, and the first connecting member 131 and the second connecting member 132 are slidably connected in the casing 41 by means of sliding grooves 135 formed thereon, and the casing 41 is internally provided with a guide plate 413 running through the sliding grooves 135 to prevent the first connecting member 131 and the second connecting member 132 from shifting during transmission during transmission.

Further, in the present disclosure, the number of teeth of the third gear 431 is smaller than the number of teeth of the fourth gear 432 to further limit the transmission ratio of the transmission assembly 4 to ensure the output effect of the garden work assembly 1.

It is to be noted that in an embodiment of the present disclosure (e.g., FIG. 5), the first support members 423 are 2 stacked bearings, and the two bearings are riveted to the gear box 411 by means of the gear shaft of the first gear 421; similarly, the second support members 424 are 2 stacked bearings, and the two bearings are riveted to the gear box 411 by means of the connecting shaft of the second gear 422. In another embodiment of the present disclosure, the first support members 423 are sliding sleeves riveted to the gear box 411 by the gear shaft of the first gear 421; and the second support members 424 are 2 bearings riveted to the gear box 411 by the connecting shaft of the second gear 422 and arranged in a stacked manner.

Figure 8:
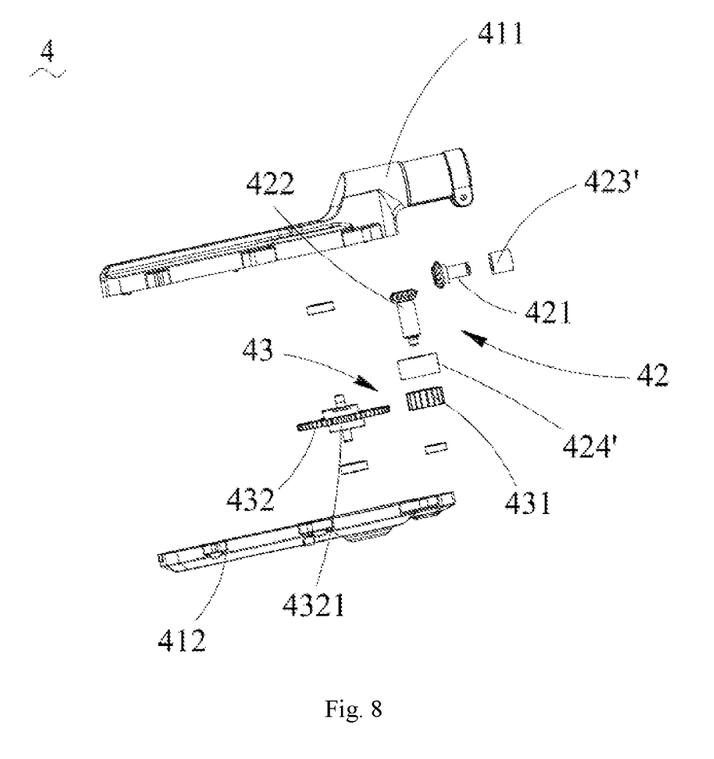
FIG. 8 shows dissembled parts of another embodiment of a transmission assembly in FIG. 1.

Of course, in other embodiments of the present disclosure, the first support members 423 may also be configured as 2 bearings riveted to the gear box 411 by means of the gear shaft of the first gear 421; and the second support members 424 are sliding sleeves riveted to the gear box 411 by means of the connecting shaft of the second gear 422; or referring to FIG. 8, the first supporting members 423' are sliding sleeves riveted to the gear box 411 by means of the gear shaft of the first gear 421; and the second supporting members 424' are sliding sleeves riveted to the gear box 411 by means of the connecting shaft of the second gear 422. That is, the specific forms and numbers of the first support members 423 and the second support members 424 in the present disclosure may be selected according to actual needs.

Further, the garden tool 100 further includes a holding assembly 5, the holding assembly 5 including a handle 51 connected to the housing 21 of the drive assembly 2, an auxiliary handle 52 removably connected to the connecting rod component 23, and a strap buckle assembly 53. In an embodiment of the present disclosure, the handle 51 is removably connected to the housing 21, and of course in other embodiments of the present disclosure, the handle 51 may also be formed on the housing 21; preferably, the auxiliary handle 52 may be removably connected to the connecting rod component 23, and the strap buckle assembly 53 may be removably connected to the connecting rod component 23 to facilitate the connection and installation of the garden tool 100.

Referring to Table 1, with the speed of the drive motor 22 being 5000 r/min, as an example, the transmission ratio and transmission efficiency of the garden tool 100 of the present disclosure are tested, and comparison in terms of the influence of the form of the transmission assembly on the performance of the garden tool 100 is performed, to obtain a transmission ratio suitable for use in the garden tool 100 of the present disclosure:

As can be seen from the above table, in the case where the number of teeth of the first gear is 16, the number of teeth of the second gear is 15, the number of teeth of the third gear is 51; the number of teeth of the fourth gear is 18; and the transmission ratio of the transmission assembly 4 is controlled to be 3.02, and the output speed of the transmission assembly 4 is 1650 r/min, the garden tool 100 has the best performance and is suitable for practical use.

In addition, it is to be noted that the present disclosure merely take the case where the garden tool 100 is a hedge trimmer and the garden work assembly 1 is a cutter blade as an example, and in other embodiments of the present disclosure, the garden tool 100 may also be other garden devices/systems suitable for the transmission assembly 4 of the present disclosure, that is, the description of the garden tool 100, i.e., the garden work assembly 1, in the accompanying drawings and specification of the present disclosure is only exemplary, and the present disclosure should not be limited thereto.

Further, the optimal numbers of teeth and the optimal transmission ratio shown in Table 1 are only the optimal configuration of the transmission assembly 4 in the case where the garden tool 100 is a pruner. If the structure and form of the garden tool 100 change, the configuration and transmission ratio of the transmission assembly 4 may also change correspondingly, so long as the performance of the garden tool 100 is ensured.

In summary, with the first transmission component 41 and the second transmission component 42 engaged with each other provided in the transmission assembly 4 of the present disclosure, the transmission ratio of the drive assembly 2 and the garden work assembly 1 connected at both ends of the transmission assembly 4 can be effectively adjusted, and the transmission assembly 4 has a simple structure, and thus is easy to manufacture and assemble. Further, the garden tool 100 using the transmission assembly 4 can efficiently and quickly accomplish corresponding gardening work, and ensures that the drive assembly 2 has a stable and suitable output and a small output power while ensuring the working efficiency of the garden work assembly 1; and it effectively improves the practicality of the garden tool 100, and reduces the cost for manufacturing and using the garden tool 100.

The above embodiments are only used for illustrating the technical solutions of the present disclosure rather than for limitations. Although the present disclosure is described in detail with reference to the embodiments, those of ordinary skill in the art should understand that they still can make modifications or equivalent substitutions to the technical solutions of the present disclosure without departing from the spirit and scope of the technical solutions of the present disclosure.

The invention claimed is:

1. A transmission assembly for connecting a drive assembly and a garden work assembly,

TABLE 1

| Number of teeth | | | | Transmission ratio | Output speed | Cutting effect | Gear box temperature | Noise |
| --- | --- | --- | --- | --- | --- | --- | --- | --- |
| First gear | Second gear | Third gear | Fourth gear | | | | | |
| 16 | 15 | 51 | 18 | 3.02 | 1654.41 | Good | Medium | Low |
| 14 | 15 | 51 | 18 | 2.64 | 1890.76 | General | High | High |
| 14 | 15 | 51 | 19 | 2.51 | 1995.80 | General | High | High |
| 17 | 15 | 52 | 18 | 3.27 | 1527.15 | General | Medium | Medium |
| 18 | 15 | 52 | 18 | 3.47 | 1442.31 | Bad | Medium | Low | wherein,
the transmission assembly comprises a casing and a first transmission component and a second transmission component accommodated in the casing, the first transmission component and the second transmission component are engaged with each other, the first transmission component comprises a first gear and a second gear engaged with each other, a gear shaft of the first gear is disposed at an angle with respect to a connecting shaft of the second gear, and the second transmission component comprises a third gear able to rotate coaxially with the second gear and a fourth gear engaged with the third gear, and
the number of teeth of the first gear is 16, the number of teeth of the second gear is 15, the number of teeth of the third gear is 51; the number of teeth of the fourth gear is 18; and the transmission ratio of the transmission assembly is controllable to be 3.02, and the output speed of the transmission assembly is controllable to be 1650 r/min.

2. The transmission assembly according to claim 1, wherein the first gear and the second gear are both bevel gears, the gear shaft of the first gear is coupled to a drive shaft of the drive assembly by a spline, and at least one first support member is provided between the first gear and the drive shaft.

3. The transmission assembly according to claim 2, wherein the third gear is sleeved on the connecting shaft of the second gear, at least one second support member is provided between the second gear and the third gear, and the second support member is sleeved on the connecting shaft of the second gear.

4. The transmission assembly according to claim 3,
wherein the first support member and/or the second support member is one of a bearing or a sliding sleeve,
wherein the first support member and/or the second support member is connected to the casing.

5. The transmission assembly according to claim 1, wherein the third gear is a cylindrical gear provided coaxially with the second gear, and the fourth gear is an eccentric wheel engaged with the cylindrical gear.

6. The transmission assembly according to claim 1, wherein an axis of the gear shaft of the first gear and an axis of the connecting shaft of the second gear are perpendicular to each other; and the axis of connecting shaft of the second gear, an axis of the third gear and an axis of the fourth gear are parallel to each other.

7. A garden tool, comprising:
a garden work assembly for performing a branch/shrub pruning task;
a drive assembly for driving the garden work assembly;
a power supply assembly for supplying power to the drive assembly; and
a transmission assembly for connecting the drive assembly and the garden work assembly,
wherein the transmission assembly comprises a casing and a first transmission component and a second transmission component accommodated in the casing, the first transmission component and the second transmission component are engaged with each other, the first transmission component comprises a first gear and a second gear engaged with each other, a gear shaft of the first gear is disposed at an angle with respect to a connecting shaft of the second gear, and the second transmission component comprises a third gear able to rotate coaxially with the second gear and a fourth gear engaged with the third gear,
wherein the number of teeth of the first gear is 16, the number of teeth of the second gear is 15, the number of teeth of the third gear is 51; the number of teeth of the fourth gear is 18; and the transmission ratio of the transmission assembly is controllable to be 3.02, and the output speed of the transmission assembly is controllable to be 1650 r/min, so that the output speed of the transmission assembly is stable.

8. The garden tool according to claim 7,
wherein the drive assembly comprises a housing, a drive motor accommodated in the housing, a connecting rod component for connecting the drive motor and the transmission assembly, and a control component for controlling the operation of the drive motor,
wherein the power supply assembly is accommodated in the housing and electrically connected to the drive motor.

9. The garden tool according to claim 8,
wherein the connecting rod component comprises a hard shaft inserted in a motor clamp tube of the drive motor and a connecting rod for accommodating the hard shaft,
wherein one end of the hard shaft is connected to the gear shaft of the first gear, and the other end thereof is connected in the motor clamp tube of the drive motor.

10. The garden tool according to claim 9, wherein one end of the connecting rod is inserted in the casing of the transmission assembly, the other end thereof is connected and accommodated in the housing, and a positioning bearing for fixing and positing the hard shaft is further provided in the connecting rod.

\* \* \* \* \*